(12) United States Patent
Tanaka

(10) Patent No.: US 7,646,545 B2
(45) Date of Patent: Jan. 12, 2010

(54) OPTICAL ELEMENT

(75) Inventor: Keita Tanaka, Aichi (JP)

(73) Assignee: Sony Corporation (JP)

( * ) Notice: Subject to any disclaimer, the term of this patent is extended or adjusted under 35 U.S.C. 154(b) by 18 days.

(21) Appl. No.: 11/509,150

(22) Filed: Aug. 24, 2006

(65) Prior Publication Data

US 2007/0047119 A1 Mar. 1, 2007

(30) Foreign Application Priority Data

Aug. 24, 2005 (JP) ............................ P2005-243296

(51) Int. Cl.
*G02B 1/06* (2006.01)

(52) U.S. Cl. ..................................... 359/665
(58) Field of Classification Search ................. 359/665, 359/666

See application file for complete search history.

(56) References Cited

U.S. PATENT DOCUMENTS

| | | | |
|---|---|---|---|
| 4,690,749 A | * | 9/1987 | Van Alstine et al. ......... 204/454 |
| 6,702,483 B2 | | 3/2004 | Tsuboi et al. |
| 2007/0041101 A1 | * | 2/2007 | Goosey et al. .............. 359/676 |

FOREIGN PATENT DOCUMENTS

| | | |
|---|---|---|
| JP | 6-071830 A | 3/1994 |
| JP | 2000-356750 A | 12/2000 |
| JP | 2001-228307 | 8/2001 |
| JP | 2005-63284 | 3/2005 |
| JP | 2005-206621 A | 8/2005 |
| JP | 2005-243296 | 9/2005 |

* cited by examiner

*Primary Examiner*—William C Choi
(74) *Attorney, Agent, or Firm*—Lerner, David, Littenberg, Krumholz & Mentlik, LLP

(57) ABSTRACT

An optical element includes an airtight container having opposing face walls in a thickness direction, and side walls connecting the end face walls; a first liquid sealed in the container and having polarity or conductivity; a second liquid sealed in the container and not mixed with the first liquid so as to define an interface between the first liquid and the second liquid; and voltage applying means for applying a voltage to the first liquid. Further, the first liquid and the second liquid have the same specific gravity and substantially the same refractive index, and minute particles made of a material that does not transmit light are mixed in the first liquid, such that the first liquid has less light transmittance than the second liquid. In a state in which the voltage is applied to the first liquid, the interface between the first liquid and the second liquid deforms, and a transmitting path of light is formed that passes through the end face walls and propagates in the thickness direction of the container.

5 Claims, 11 Drawing Sheets

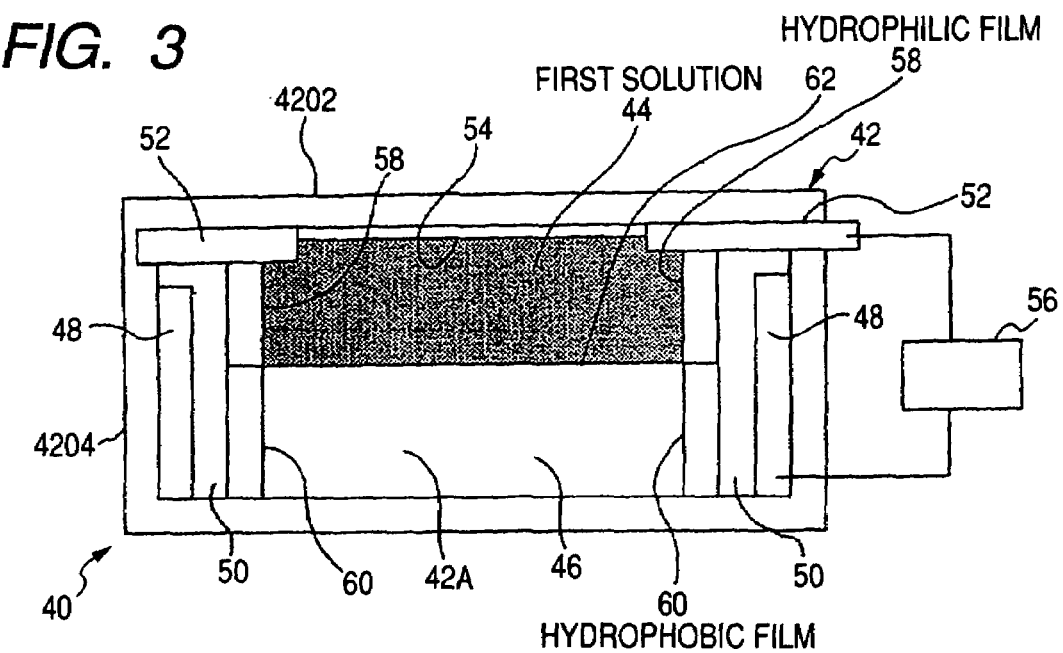
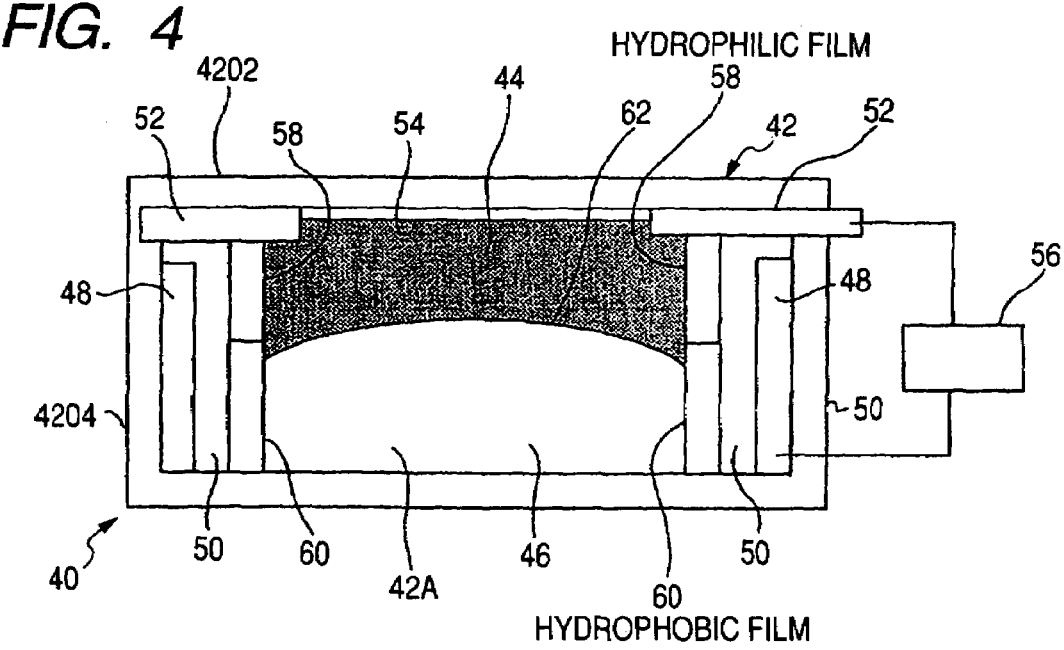

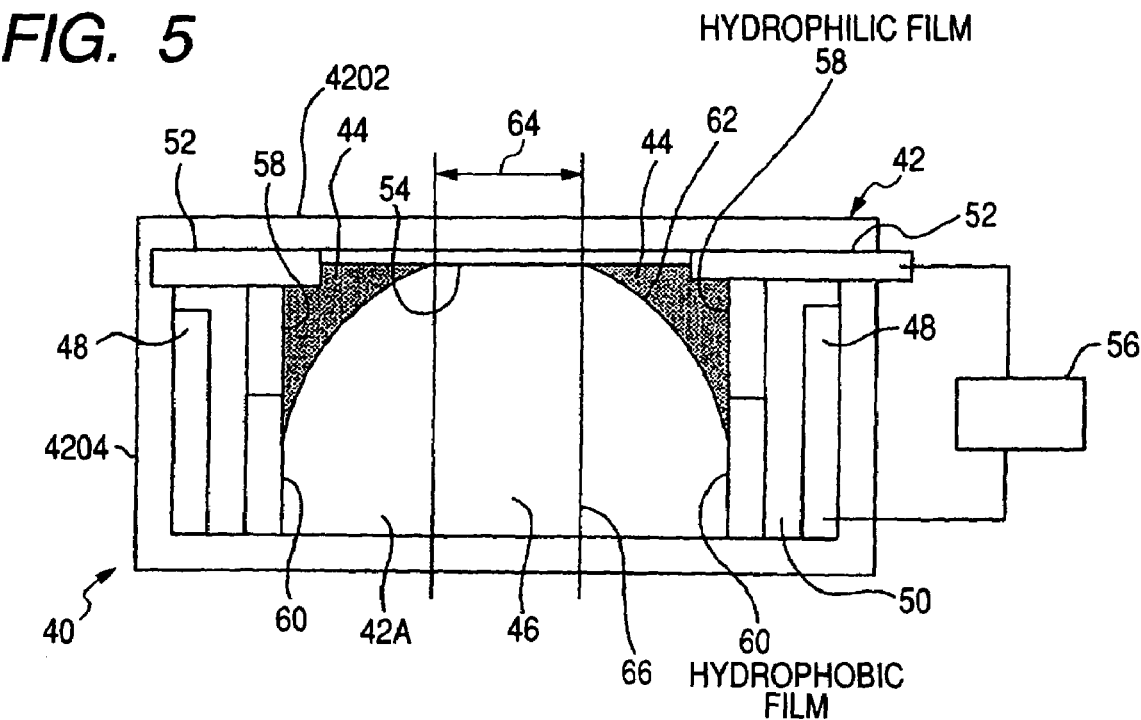
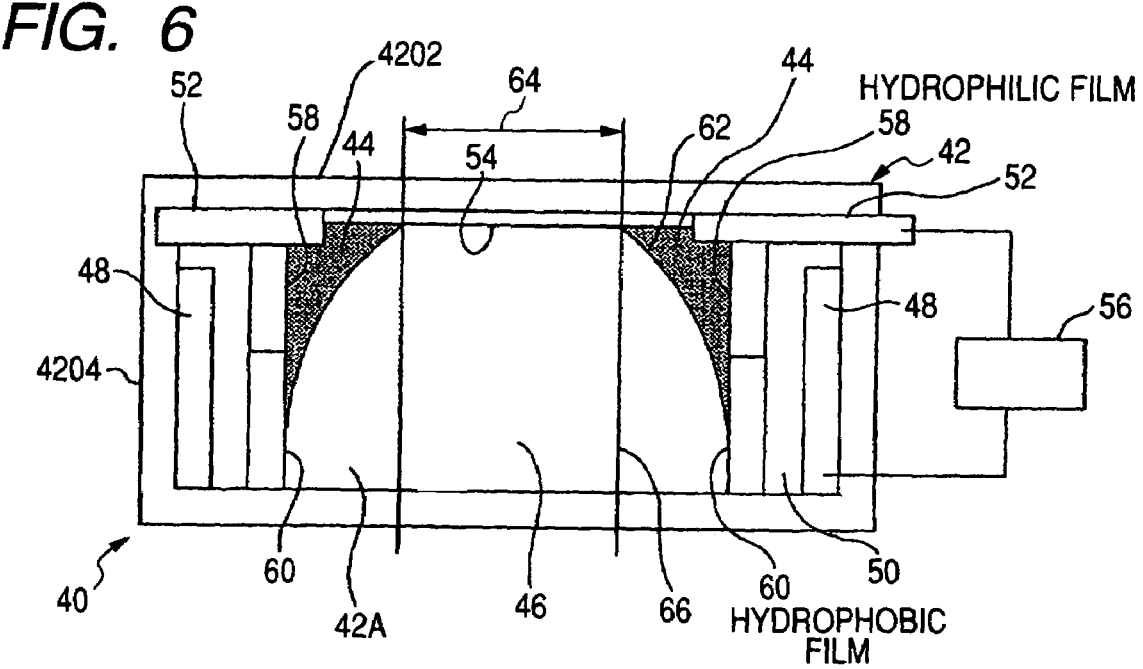

|  | A GROUP | B GROUP | C GROUP | D GROUP |
|---|---|---|---|---|
| REFRACTIVE INDEX | 1.32 - 1.41 | 1.32 - 1.41 | 1.41 - 1.63 | 1.41 - 1.6 |
| SPECIFIC GRAVITY | 0.9 - 1.2 | 0.6 - 0.9 | 1.05 - 1.7 | 0.8 - 1.05 |

FIG. 13 SOLVENT DATA

| | | REFRACTIVE INDEX | SPECIFIC GRAVITY |
|---|---|---|---|
| A GROUP | WATER | 1.333 | 1 |
| | NITROMETHANE | 1.38056 | 1.1322 |
| | ACETIC ANHYDRIDE | 1.3904 | 1.082 |
| | METHYL ACETATE | 1.3614 | 0.9342 |
| | ETHYL ACETATE | 1.3719 | 0.902 |
| B GROUP | METHANOL | 1.3292 | 0.7915 |
| | ACETONITRILE | 1.34604 | 0.78745 |
| | ACETONE | 1.3591 | 0.788 |
| | ETHANOL | 1.361 | 0.789 |
| | PROPIONITRILE | 1.36585 | 0.7718 |
| | TETRAHYDROFURAN | 1.407 | 0.8892 |
| | N-HEXANE | 1.375 | 0.66 |
| | 2-PROPANOL | 1.37723 | 0.78505 |
| | 2-BUTANONE | 1.3814 | 0.805 |
| | N-BUTYRONITRILE | 1.38385 | 0.7954 |
| | 1-PROPANOL | 1.3862 | 0.8053 |
| | 1-BUTANOL | 1.3993 | 0.81 |
| C GROUP | DIMETHYLSULFOXIDE | 1.4795 | 1.1 |
| | CHLOROBENZENE | 1.5248 | 1.107 |
| | ETHYLENE GLYCOL | 1.43063 | 1.1135 |
| | FORMAMIDE | 1.44754 | 1.1334 |
| | NITROBENZENE | 1.5529 | 1.205 |
| | PROPYLENE CARBONATE | 1.4209 | 1.2065 |
| | 1,2-DICHLOROETHANE | 1.4443 | 1.2569 |
| | CARBON DISULFIDE | 1.62803 | 1.2632 |
| | CHLOROFORM | 1.4476 | 1.484 |
| | BROMOBENZENE | 1.5602 | 1.4952 |
| | CARBON TETRACHLORIDE | 1.4607 | 1.589 |
| | TRICHLOROACETIC ANHYDRIDE | 1.484 | 1.69 |
| D GROUP | TOLUENE | 1.4967 | 0.866 |
| | BENZENE | 1.50108 | 0.8787 |
| | ETHYLENEDIAMINE | 1.454 | 0.898 |
| | N,N-DIMETHYLACETAMIDE | 1.423 | 0.9429 |
| | N,N-DIMETHYLFORMAMIDE | 1.42803 | 0.9445 |
| | TRIBUTYL PHOSPHATE | 1.4215 | 0.976 |
| | PYRIDINE | 1.5092 | 0.98272 |
| | BENZONITRILE | 1.5289 | 1.01 |
| | ANILINE | 1.5863 | 1.022 |
| | 1,4-DIOXANE | 1.4175 | 1.029 |
| | HEXAMETHYLPHOSPHORAMIDE | 1.4579 | 1.0295 |

| CONCENTRATION (wt%) | CB |
|---:|---:|
| 0 | 1.3326 |
| 0.003 | 1.3328 |
| 0.05 | 1.3328 |
| 0.1 | 1.3331 |
| 0.5 | 1.3348 |
| 1 | 1.3372 |

OPTICAL ELEMENT

CROSS-REFERENCE TO RELATED APPLICATIONS

The present application claims priority from Japanese Patent Application No. JP 2005-243296 filed on Aug. 24, 2005, the disclosure of which is hereby incorporated by reference herein.

BACKGROUND OF THE INVENTION

1. Field of the Invention

The present invention relates to an optical element.

2. Description of the Related Art

An optical element 10 that adjusts the quantity of transmitted light by using electrocapillarity (electrowetting phenomenon) has been suggested (see JP-A-2001-228307).

As shown in FIG. 17, the optical element 10 includes an airtight container 16 that has end face walls 12 opposite to each other in a thickness direction, and side walls 14 connecting the end face walls 12, a first liquid 20 that is sealed in the container 16 and has polarity or conductivity, and a second liquid 22 that is sealed in the container 16 and has larger transmittance than the first liquid 20.

In addition, as the first liquid 20 and the second liquid 22, liquids having properties that are not mixed with each other, and liquids that have the same specific gradient are used. In a case in which only the first liquid 20 and the second liquid 22 are sealed in the container 16 without air permeating into the container 16, even though the container 16 is made to rotate or the container 16 is shaken, the initial state in which only the first liquid 20 and the second liquid 22 are sealed in the container 16 is maintained, and a state in which the interface 24 is substantially parallel to the end face wall 12 is maintained.

In FIG. 17, reference numeral 28 indicates an electrode for applying a voltage to the first liquid 20, and reference numeral 30 indicates an insulating film to cover the electrode 28.

In addition, when the voltage is applied to the first liquid 20 by a voltage applying means, by electrocapillarity, the interface 24 between the first liquid 20 and the second liquid 22 deforms, as shown by solid lines and broken lines of FIG. 17, and thus a transmitting path 18 of light that passes through the end face wall 12 and propagates in a thickness direction in the container 16 is formed.

Specifically, in a state in which a voltage is not applied, the first liquid 20 extends over the entire region in a direction orthogonal to a light transmitting direction, as shown by a solid line of FIG. 17, which results in obstructing light transmission or reducing the quantity of transmitted light. At this time, if an applied voltage is increased, as shown by broken lines in FIG. 17, the second liquid 22 comes into contact with the two end face walls 12 to form a transmitting path 18. By adjusting an applied voltage, a contact area between the second liquid 22 and one end face wall 12 is increased or decreased, and thus the size of the transmitting path 18 is adjusted.

In the optical element 10 according to the related art, it is very important to select liquids for the first liquid 20 and the second liquid 22 from various known liquids.

That is, liquids that have the same specific gravity should be selected as the first liquid 20 and the second liquid 22.

Accordingly, when an optical element 10 is manufactured, since there is a limit in kinds of used liquids, it is difficult to manufacture an optical element 10 having desired characteristic.

Accordingly, there is a need for simply manufacturing an optical element having predetermined characteristic.

SUMMARY OF THE INVENTION

According to an embodiment of the invention, an optical element includes an airtight container having opposing end face walls in a thickness direction, and side walls connecting the end face walls; a first liquid sealed in the container and having polarity or conductivity; a second liquid sealed in the container and not mixed with the first liquid so as to form an interface between the first liquid and the second liquid; and voltage applying means for applying a voltage to the first liquid. Further, the first liquid and the second liquid have the same specific gravity and substantially the same refractive index, and minute particles made of a material that does not transmit light are mixed in the first liquid, such that the first liquid has less light transmittance than the second liquid. In a state in which the voltage is applied to the first liquid, the interface between the first liquid and the second liquid deforms, and a transmitting path of light is formed that passes through the end face walls and propagates in the thickness direction of the container. The refractive index of the first liquid is set by adjusting the content of the minute particles in the first liquid.

According to an embodiment of the invention, the refractive index of the first liquid can be set to be substantially the same as that of the second liquid by adjusting the content of the minute particles mixed in the first liquid. Therefore, it is possible to simply manufacture an optical element having desired characteristics.

BRIEF DESCRIPTION OF THE DRAWINGS

FIG. 3 is a diagram illustrating a state in which a voltage is not applied to an optical element 40;

FIG. 4 is a diagram illustrating a state in which a first voltage E1 is applied to an optical element 40;

FIG. 5 is a diagram illustrating a state in which a second voltage E2 larger than a first voltage E1 is applied to an optical element 40;

FIG. 6 is a diagram illustrating a state in which a third voltage E3 larger than a second voltage E2 is applied to an optical element 40;

FIG. 13 is a diagram illustrating numerical values of specific gravity and refractive indexes of various used liquids;

DETAILED DESCRIPTION

The present application is related to the subject matter of U.S. application Ser. No. 11/359,414 filed on Feb. 23, 2006 and Ser. No. 11/365,586 filed on Mar. 2, 2006, the disclosures of which are hereby incorporated by reference herein.

First, a principle of electrocapillarity (electrowetting phenomenon) that is used by an optical element according to an embodiment of the invention will be described.

Figure 2A:
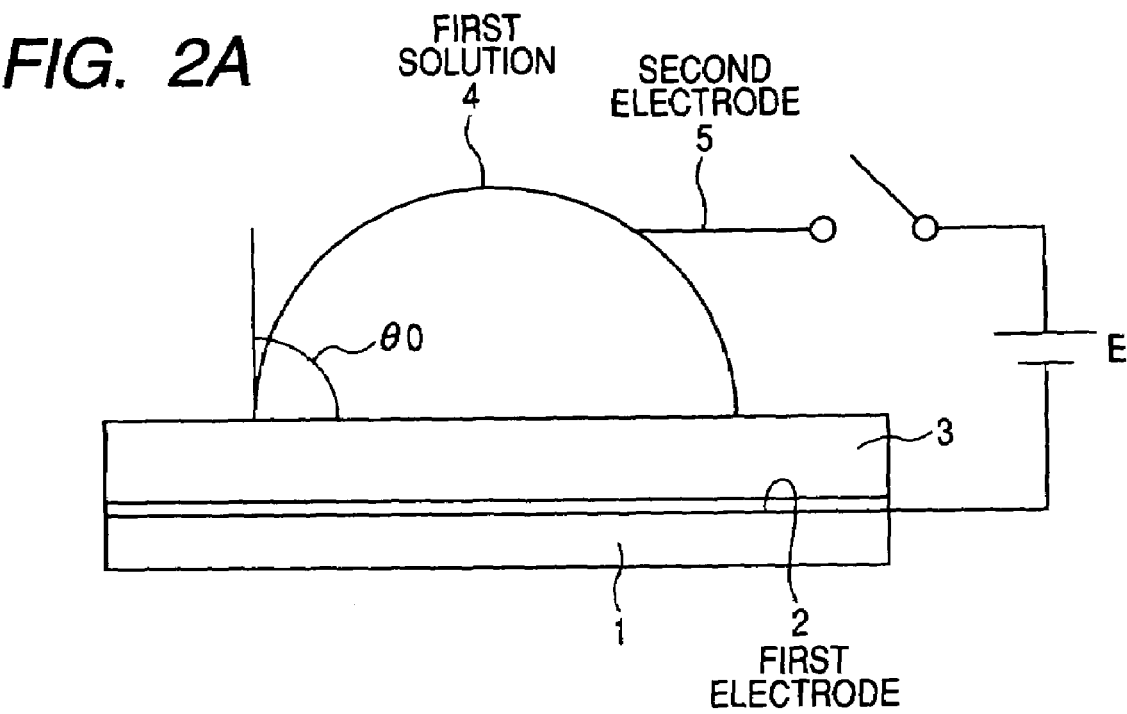
FIG. 2A is a diagram illustrating a principle of electrocapillarity, which illustrates a state before a voltage is applied.
Figure 2B:
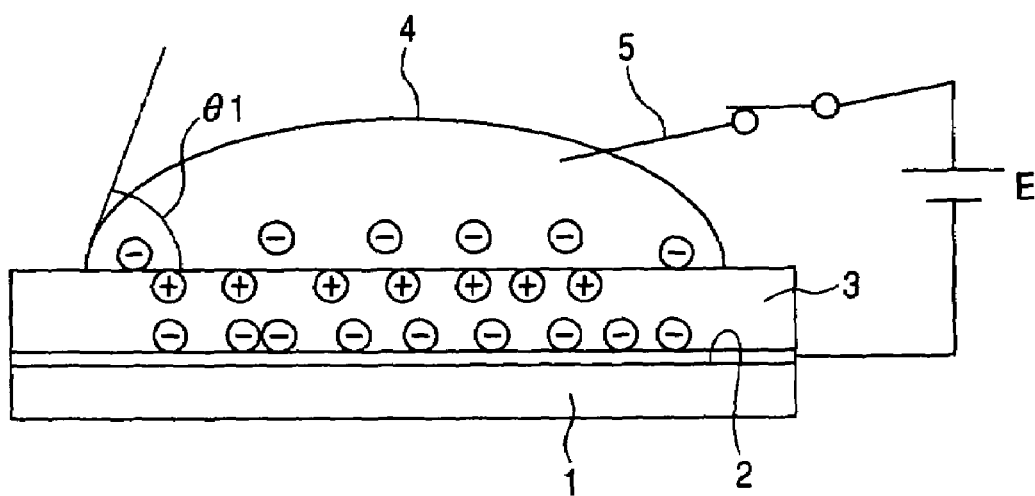
FIG. 2B is a diagram illustrating a principle of electrocapillarity, which illustrates a state after a voltage is applied.

FIG. 2A is a diagram illustrating a principle of electrocapillarity, which illustrates a state before a voltage is applied, and FIG. 2B is a diagram illustrating a principle of electrocapillarity, which illustrates a state after a voltage is applied.

As shown in FIG. 2A, a first electrode 2 is formed on a surface of a substrate 1, and an insulating film 3 is formed on a surface of the first electrode 2.

A first liquid 4 that has polarity or conductivity is disposed on a surface of the insulating film 3, and a second electrode 5 is electrically connected to the first liquid 4.

As shown in FIG. 2A, in a state in which a voltage E is not applied between the first electrode 2 and the second electrode 5, a surface of the first liquid 4 forms almost a spherical shape, in which the convex is formed upward, by means of surface tension. At this time, an angle θ between a surface of the insulating film 3 and a surface of a portion of the first liquid 4 which comes into contact with the insulating film 3, that is, a contact angle θ is referred to as θ0.

As shown in FIG. 2B, in a state in which a voltage E is applied between the first electrode 2 and the second electrode 5, plus charges are charged on the surface of the insulating film 3, and an electric field (electrostatic force) is applied to molecules that form the first liquid 4. Thereby, the molecules that form the first liquid 4 are attracted, such that wettability of the first liquid 4 with respect to the insulating film 3 is improved, and the contact angle θ becomes θ1 that is smaller than θ0. Further, when the voltage E is increased, the contact angle θ is decreased.

This phenomenon is called electrocapillarity.

Next, an optical element 40 on which the invention bases will be described. Further, the optical element 40 itself is new and the invention uses the optical element 40, and the inventors have already applied for the optical element 40 (JP-A-2005-63284).

Figure 1:
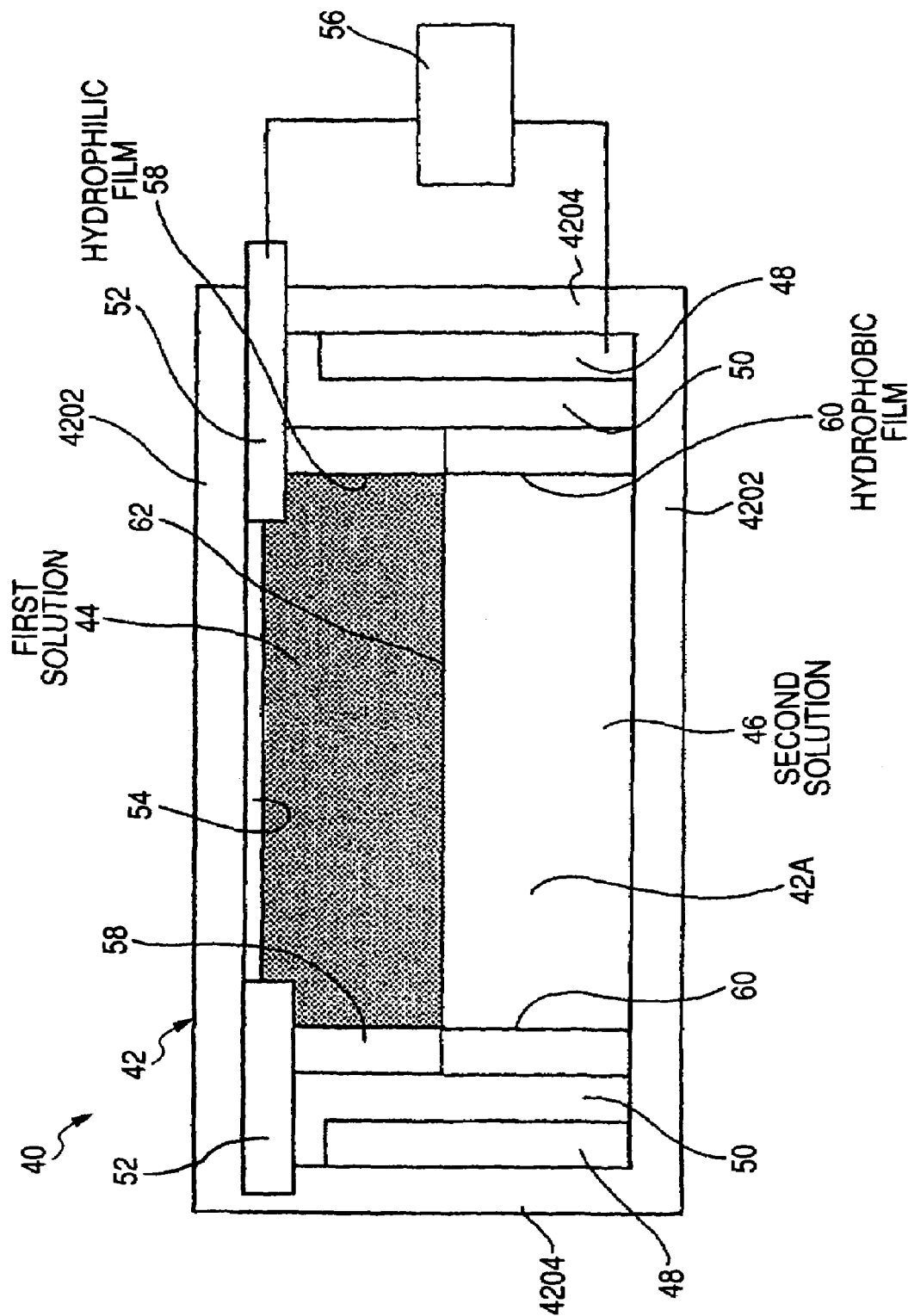
FIG. 1 is a diagram illustrating the structure of an optical element 40.

FIG. 1 is a cross-sectional view illustrating the structure of the optical element 40.

As shown in FIG. 1, the optical element 40 includes a container 42, a first liquid 44, a second liquid 46, and a voltage applying section.

The container 42 has end face walls 4202 that are opposite to each other in a thickness direction, and side walls 4204 that connect the end face walls 4202. The container 42 has an accommodating chamber 42A that becomes airtight by the end face walls 4202 and the side walls 4204.

The end face wall 4202 forms a circular plate shape, the side wall 4204 forms a cylindrical shape having the same outer diameter as the outer diameter of each of the end face walls 4202, and the accommodating chamber 42A has a flat cylindrical column shape.

Further, each of the end face walls 4202 and the side walls 4204 is formed of an insulating material, and each of the end face walls 4202 is formed of a light transmitting transparent material.

As a material that forms each of the end face walls 4202, a transparent insulating synthesis resin material or a transparent glass material may be used.

On the inner sides of the side walls 4204, first electrodes 48 (electrodes having negative polarity) extend in a cylindrical shape along the entire circumference of the side walls 4204, and on the inner side of the first electrode 48, an insulating film 50 extends in a cylindrical shape along the entire circumference of the first electrode 48 so as to cover the entire region of the first electrode 48.

At locations that close to outer circumference sides of an inner surface of one end face wall 4202 of the two end face walls 4202, second electrodes 52 (electrodes having positive polarity) having a cylindrical shape extend so as to form a concentric shape together with one end face wall 4202. In the second electrode 52, an inner circumferential portion is exposed to the accommodating chamber 42A, and the second electrode 52 is insulated from the first electrode 48 by the insulating film 50.

In one end face wall 4202 of the two end face walls 4202, in the entire inner region of the second electrode 52 in an inner surface of the one end face wall 4202, a transparent hydrophilic film 54 that transmits light is formed. The hydrophilic film 54 is configured such that wettability of the hydrophilic film 54 with respect to the first liquid 44 is larger than wettability of the hydrophilic film 54 with respect to the second liquid 46.

Outside the container 42, a power supply 56 whose output voltage varies is provided, and a negative voltage output terminal of the power supply 56 is electrically connected to the first electrode 48, and a positive voltage output terminal of the power supply 56 is electrically connected to the second electrode 52.

The first electrodes 48, the second electrodes 52, and the power supply 56 form the voltage applying section.

The first liquid 44 having polarity or conductivity is sealed in the container 42.

The second liquid 46 is not mixed with the first liquid 44, and it is sealed in the container 42.

Further, the first liquid 44 and the second liquid 46 have substantially the same specific gravity, and the first liquid 44 has smaller transmittance than the second liquid 46. According to experiments performed by the inventors, if the specific gravity difference of the first liquid 44 with respect to the second liquid 46 is 0.5% or less, preferably, 0.2% or less, even though the posture of the container 42 is varied, an initial state where the first liquid 44 and the second liquid 46 are sealed is maintained, and a state in which the interface 62 between the first liquid 44 and the second liquid 46 is substantially parallel to the end face wall 4202 is maintained.

The first liquid 44 and the second liquid 46 will be described in detail.

At a portion of an inner surface of the side wall 4204 where the first liquid 44 is disposed, a hydrophilic film 58 is formed. At a portion of an inner surface of the side wall 4204 where the second liquid 46 is disposed, a hydrophobic film 60 is formed.

The hydrophilic film 58 is configured such that wettability of the hydrophilic film 58 with respect to the first liquid 44 is larger than wettability of the hydrophilic film 58 with respect to the second liquid 46. That is, a contact angle of the first liquid 44 with respect to the hydrophilic film 58 becomes smaller than a contact angle of the second liquid 46 with respect to the hydrophilic film 58.

The hydrophilic film 58 can be formed by applying a hydrophilic polymer or a surfactant onto the inner surfaces of the side walls 4204. Further, as forming materials of the hydrophilic film 58, various known materials in the related art may be used.

The hydrophobic film 60 is configured such that wettability with respect to the second liquid 46 is higher than wettability with respect to the first liquid 44. That is, a contact angle of the second liquid 46 with respect to hydrophobic film 60 becomes smaller than a contact angle of the first liquid 44 with respect to the hydrophobic film 60.

For example, the hydrophobic film 60 can be formed by applying a water repellent treating agent made of, for example, a fluorine compound on the inner surface of the side wall 4204. Further, as forming materials of the hydrophobic film 60, various known materials in the related art may be used.

In the accommodating chamber 42A of the container 42, first, the second liquid 46 exists on the end face wall 4202 at the side where the hydrophobic film 60 is provided. The second liquid 46 is injected such that the surface of the second liquid 46 is located on the upper edge of the hydrophobic film 60. Then, the first liquid 44 is injected thereon, the air is exhausted from the accommodating chamber 42A, and the second liquid 46 and the first liquid 44 are sealed in the container 42.

Thereby, the entire region of the first liquid 44 that is disposed on the entire outer circumferential region of an inner surface of the end face wall 4202 comes into contact with the second electrode 52 so as to be electrically connected to the second electrode 52. In addition, the entire region of the first liquid 44 that is disposed on the entire outer circumferential region of the accommodating chamber 42A is opposite to the first electrode 48 with the insulating film 50, the hydrophilic film 58, and the hydrophobic film 60 interposed therebetween.

Accordingly, if the voltage is applied to the first electrode 48 and the second electrode 52 from the power supply 56, the voltage is applied to the first liquid 44.

Next, the operation of the optical element 40 will be described.

FIG. 3 is a diagram illustrating a state in which a voltage is not applied to an optical element 40, FIG. 4 is a diagram illustrating a state in which a first voltage E1 is applied to an optical element 40, FIG. 5 is a diagram illustrating a state in which a second voltage E2 larger than a first voltage E1 is applied to an optical element 40, and FIG. 6 is a diagram illustrating a state in which a third voltage E3 larger than a second voltage E2 is applied to an optical element 40.

As shown in FIG. 3, in a state in which a voltage is not applied to the first electrode 48 and the second electrode 52 from the power supply 56 (E=0 V), the entire region of the first liquid 44 that is disposed on the entire outer circumferential region of the accommodating chamber 42A comes into contact with the surface of the hydrophilic film 58 to form a contact angle of 90 degrees, and the entire region of the second liquid 46 that is disposed on the entire outer circumferential region of the accommodating chamber 42A comes into contact with the surface of the hydrophobic film 60 to form a contact angle of 90 degrees.

Accordingly, the interface 62 between the first and second liquids 44 and 46 forms a flat surface.

At this time, the first liquid 44 extends over the entire region in a direction orthogonal to the light transmitting direction, and thus the light propagating in the thickness direction of the container 40 is prevented.

If the voltage E1 is applied to the first electrode 48 and the second electrode 52 from the power supply 56 (E1>0 V), as shown in FIG. 4, by electrocapillarity, the interface 62 deforms to form a convex curved surface (spherical surface) from the second liquid 50 to the first liquid 48, such that the center of the interface 62 becomes approach one end face wall 4202. As a result, the first liquid 44 has the smallest thickness at the center thereof (that is, the center thereof is thinnest), and the thickness of the first liquid 44 becomes larger toward the outer circumference of the accommodating chamber 42A from the center thereof.

At this time, the contact angle of the first liquid 44 with respect to the hydrophobic film 60 becomes smaller than 90 degrees, and in the portions of the side walls 4204 (hydrophobic film 60), the first liquid 44 enters the second liquid 46 along the side wall 4204.

If the second voltage E2 larger than the first voltage E1 is applied to the first electrode 48 and the second electrode 52 from the power supply 56 (E2>E1), as shown in FIG. 5, the inclination of the convex curved surface (spherical surface) of the interface 62 becomes further rapid. As a result, the center of the interface 62 comes into contact with one end face wall 4202 (hydrophilic film 54).

Thereby, in a region on the end face wall 4202 (hydrophilic film 54) which the interface 62 comes into contact with, the first liquid 44 does not exist, and in the center of the accommodating chamber 42A (centers of both end face walls 4202), a region 64 where only the second liquid 46 exists is formed. By the region 64, it is possible to form a transmitting path 66 of light that passes through the end face wall 4202 and propagates in the thickness direction of the container 42.

If the third voltage E3 larger than the second voltage E2 is applied to the first electrode 48 and the second electrode 52 from the power supply 56 (E3>E2), as shown in FIG. 6, the inclination of the convex curved surface (spherical surface) of the interface 62 becomes further rapid.

In addition, the diameter of the region 64 which is formed in the center of the accommodating chamber 42A (centers of both end face walls 4202) and in which only the second liquid 46 exists is increased, and the diameter of the light transmitting path 66 is increased.

Accordingly, by adjusting the voltage applied to the first electrode 48 and the second electrode 52 from the power supply 56, it is possible to increase or decrease the diameter of the region 64 where only the second liquid 46 exists. Therefore, it is possible to perform a diaphragm operation for increasing or decreasing the diameter of the light transmitting path 66.

In the optical element 40, since the hydrophilic film 58 and the hydrophobic film 60 are used, when the voltage is not applied, a contact angle of the first liquid 44 with respect to the hydrophilic film 58 and the hydrophobic film 60 is 90 degrees, and a contact angle of the second liquid 46 with respect to the hydrophilic film 58 and the hydrophobic film 60 is 90 degrees. Since the interface 62 has a flat surface, even though the size of the optical element 40 in the light transmitting direction (the size of the optical element 40 in the thickness direction) is reduced, different from the related art, it is possible to make the second liquid 46 surely come into contact with the two end face walls 4202, in a state in which the voltage is applied.

Accordingly, in a state in which the voltage is applied, the light transmitting path 66 can be surely formed. Therefore, it is advantageous in attempting the reduction in the thickness.

Further, generally, when no voltage is applied, in a case in which the first liquid 44 forms a convex curved shape with respect to the second liquid 46 at the interface 62 between the first liquid 20 and the second liquid 22 (see FIG. 17A)), the second liquid 46 may be interposed between the first liquid 44 and the first electrode 48. Accordingly, since the voltage applied by the first electrode 48 is blocked by the second liquid 46, it is difficult for the voltage to be applied to the first liquid 44. As a result, electrocapillarity cannot be surely generated in the first liquid 44, and thus it is difficult for a diaphragm operation to be stably performed.

Meanwhile, in the optical element 40, since the interface 62 between the first liquid 44 and the second liquid 46 forms a flat shape, the second liquid 46 is not interposed between the first liquid 44 and the first electrode 48. Accordingly, the voltage applied by the first electrode 48 is applied to the first liquid 44 without being blocked by the second liquid 46. As a result, electrocapillarity can be surely generated in the first liquid 44, and thus it is difficult for a diaphragm operation to be stably performed.

Further, the hydrophobic film 60 is formed at a location of the side wall 4204 where the second liquid 46 is located. Accordingly, when the first liquid 44 extends to the locations where the hydrophobic film 60 is formed, the liquid surface of the first liquid 44 can smoothly move on the hydrophobic film 60. Therefore, a diaphragm operation can be performed at high speed.

Furthermore, since the hydrophilic film 54 is formed at a location of the end face wall 4202 where the first liquid 44 is located, wettability of the first liquid 44 with respect to the hydrophilic film 54 is excellent. Accordingly, after the second liquid 46 comes into contact with the end face wall 4202 at the firs liquid 44 side, when it is separated from the end face wall 4202, the second liquid 46 may be easily spaced apart from the hydrophilic film 54, and a diaphragm operation can be performed at high speed.

Next, the first liquid 44 and the second liquid 46 that are used in the optical element 40 will be described.

The three kinds of liquids, each of which has different specific gravity and a different refractive index, are mixed to obtain the first liquid 44. The inventors have discovered that if a mixing ratio of the three kinds of liquids is changed, the specific gravity and the refractive index of the first liquid 44 are varied over a wide range.

For example, a case in which the first liquid 44 is obtained by using two kinds of liquids will be described.

In this case, pure water and ethanol are used as two kinds of liquids to obtain the first liquid 44, and a mixing ratio between the two liquids is varied.

Figure 7:
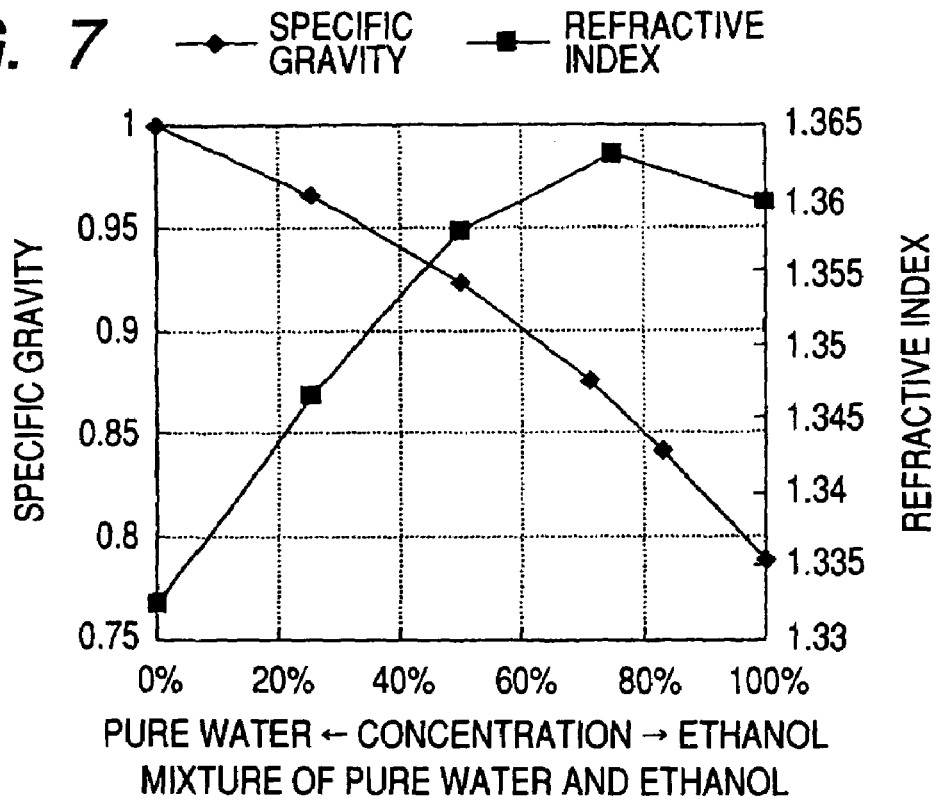
FIG. 7 is a graph illustrating characteristics of a mixing ratio of pure water and ethanol, specific gravity, and a refractive index.

As shown in FIG. 7, if the mixing ratio between the two liquids is varied, the specific gravity and the refractive index of the first liquid 44 are varied in a straight line shape or a curved shape.

Further, pure water and ethylene glycol are used as two kinds of liquids to obtain the first liquid 44, and a mixing ratio between the two liquids is varied.

Figure 8:
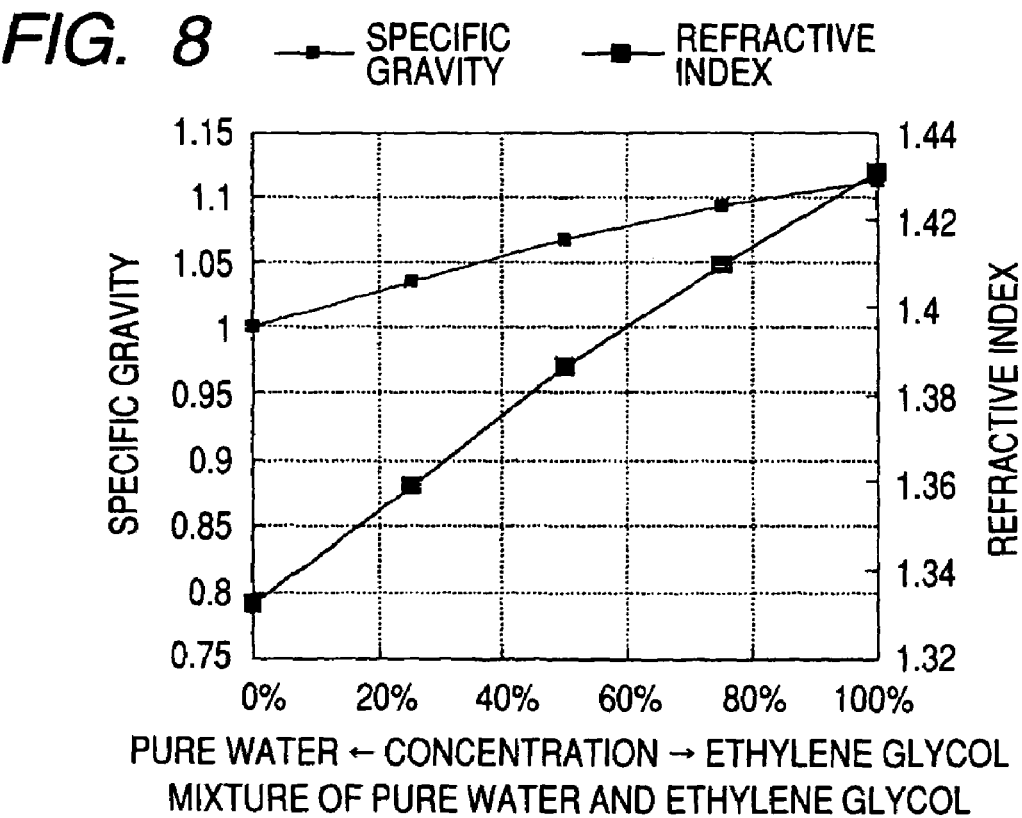
FIG. 8 is a graph illustrating characteristics of a mixing ratio of pure water and ethylene glycol, specific gravity, and a refractive index.

As shown in FIG. 8, if the mixing ratio between the two liquids is varied, the specific gravity and the refractive index of the first liquid 44 are varied in a straight line shape or a curved shape.

Further, the specific gravity of the pure water is 1.0, and the refractive index of the pure water is 1.333. The specific gravity of the ethanol is 0.78, and the refractive index of the ethanol is 1.361. The specific gravity of ethylene glycol is 1.113, and the refractive index of ethylene glycol is 1.430.

Figure 9:
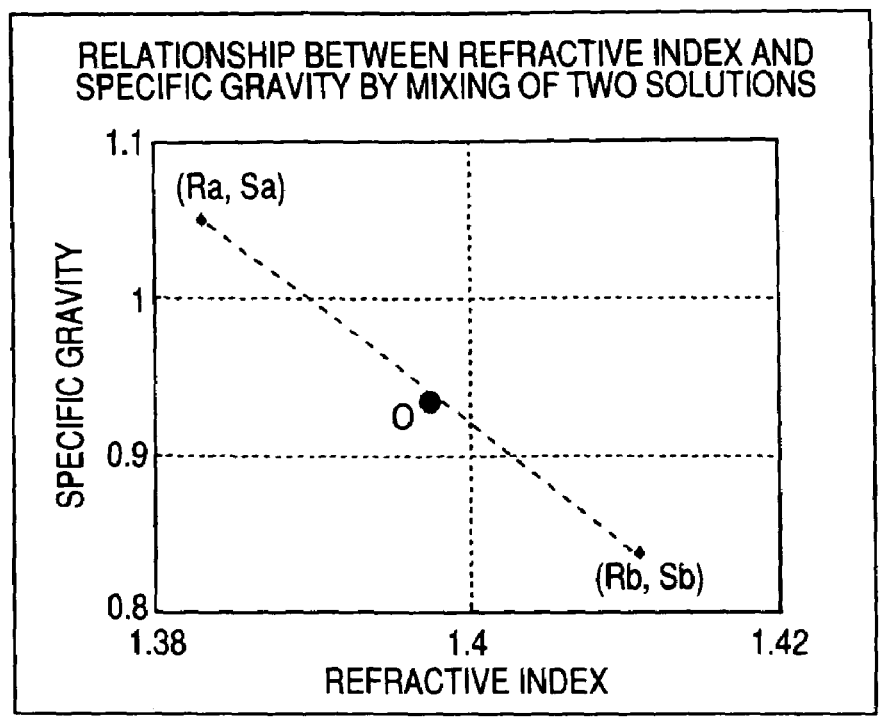
FIG. 9 is a diagram illustrating an adjustment range of a refractive index and specific gravity in a case in which two kinds of liquids A and B are mixed.

That is, as shown in FIG. 9, when the first liquid 44 is obtained by mixing two kinds of liquids A (whose refractive index is Ra, and whose specific gravity is Sa), and B (whose refractive index is Rb, and whose specific gravity is Sb), by varying a mixing ratio between the two kinds of liquids A and B, the refractive index and the specific gravity of the first liquid 44 can be adjusted on only a straight line connecting the coordinates (Ra, Sa) and the coordinates (Rb, Sb), as shown by the coordinates O in the drawing.

Meanwhile, a case will be described in which the first liquid 44 is obtained by using three kinds of liquids, and a mixing ratio among the three kinds of liquids is varied.

In this case, for example, pure water, ethanol, and ethylene glycol are used as three kinds of liquids to obtain the first liquid 44, and a mixing ratio among the three kinds of liquids is varied.

Figure 10:
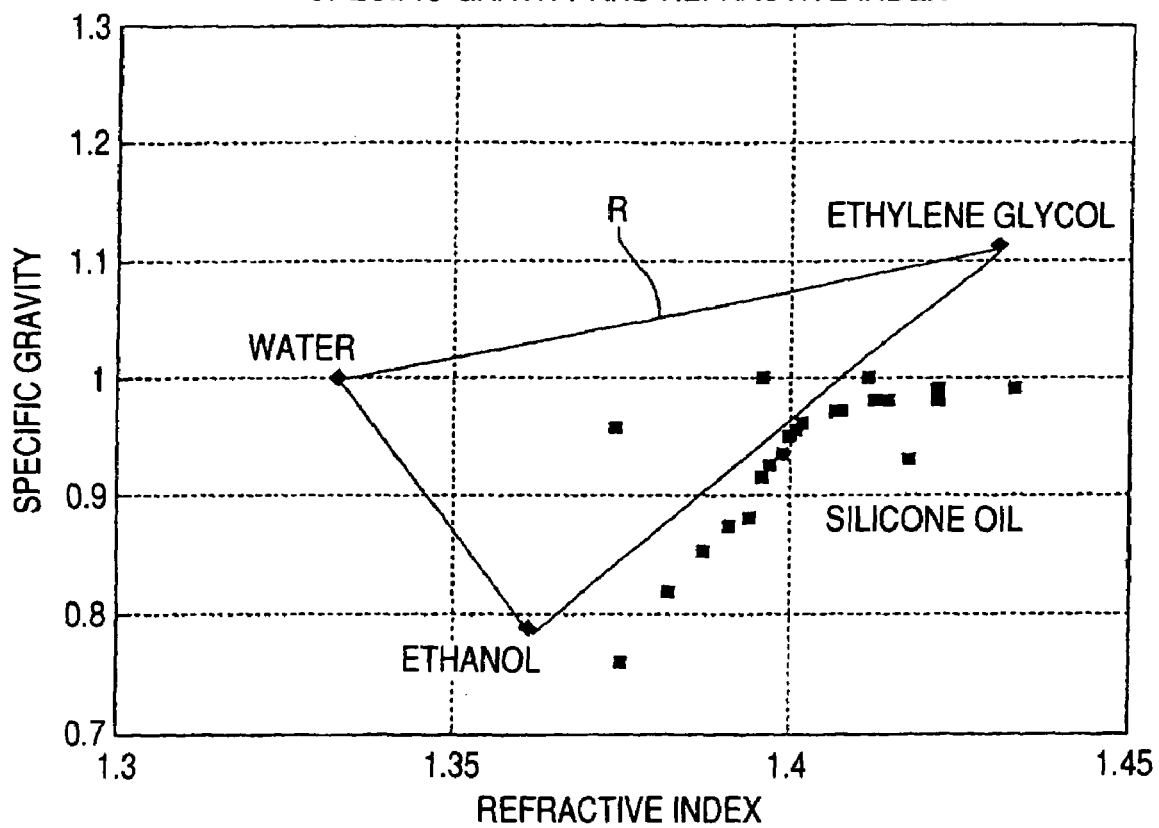
FIG. 10 is a diagram illustrating specific gravity and refractive indexes of pure water, ethanol, and ethylene glycol.

As shown in FIG. 10, by varying the mixing ratio among the pure water, the ethanol, and the ethylene glycol, the specific gravity and the refractive index of the first liquid 44 can be varied in a large triangular region R that connects the three coordinates of the pure water, the ethanol, and the ethylene glycol.

Figure 11:
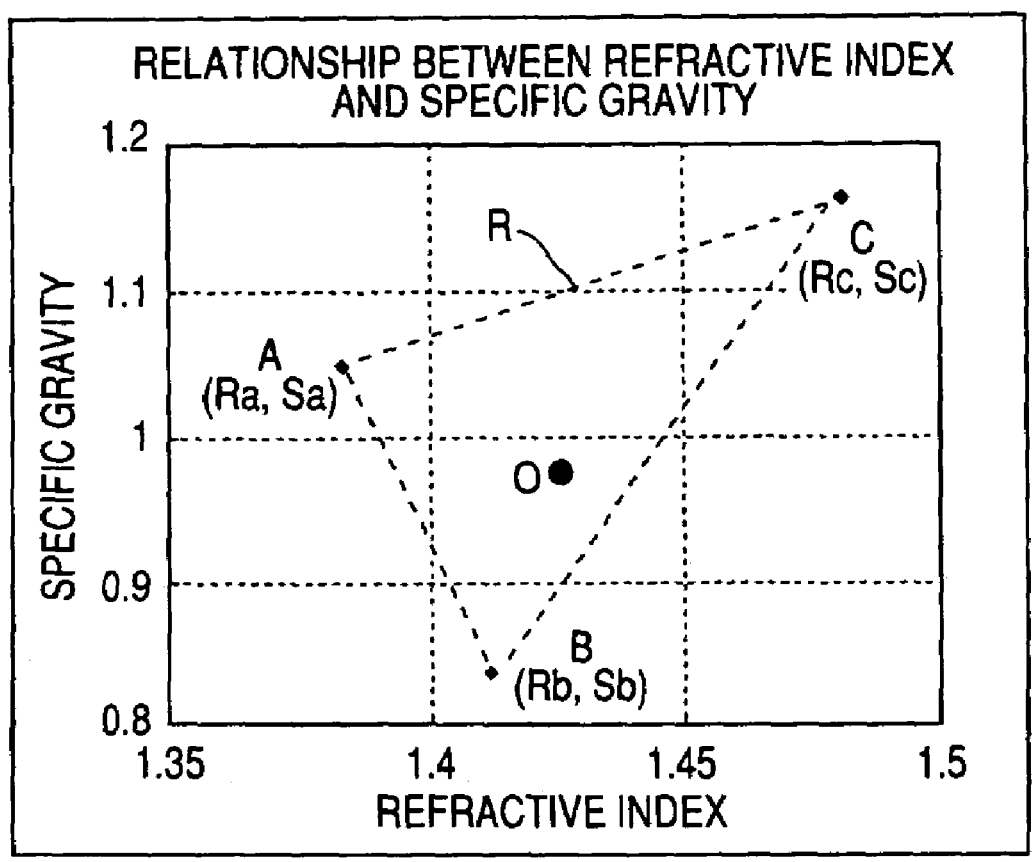
FIG. 11 is a diagram illustrating an adjustment range of a refractive index and specific gravity in a case in which three kinds of liquids A, B, and C are mixed.

That is, as shown in FIG. 11, when the first liquid 44 is obtained by mixing three kinds of liquids A (whose refractive index is Ra, and whose specific gravity is Sa), B (whose refractive index is Rb, and whose specific gravity is Sb), and C (whose refractive index is Rc, and whose specific gravity is Sc), by varying a mixing ratio among the three kinds of liquids A, B, and C, the refractive index and the specific gravity of the first liquid 44 can be adjusted in a triangular region R connecting the coordinates (Ra, Sa), the coordinates (Rb, Sb), and the coordinates (Rc, Sc), as shown by the coordinates O in the drawing.

Meanwhile, in FIG. 10, the coordinates of the specific gravity and the refractive index of each of silicone oils on the market are scattered.

Therefore, the silicone oils on the market that are scattered in the triangular region R are used as the second liquid 46, and the pure water, the ethanol, and the ethylene glycol are mixed to obtain the first liquid 44 whose specific gravity and refractive index are made to become substantially the same as the silicone oil.

The first liquid 44 can be formed by mixing minute particles (which are made of materials not transmitting light) into a liquid obtained by mixing the pure water, the ethanol, and the ethylene glycol.

In the optical element 40, carbon black is used as a minute particle, and a hydrophilic coating process is performed on the surface of the carbon black such that all the carbon black is mixed in the first liquid 44. For example, the hydrophilic coating process is performed by forming hydrophilic groups on surfaces of the carbon black.

Accordingly, the carbon black is mixed in the first liquid 44, so that the first liquid 44 is blackish, and can intercept light with a thickness of about 0.1 mm. Therefore, it is advantageous in that the size of the optical element is decreased.

If the first liquid 44 and the second liquid 46 are formed to have the same refractive index, a lens effect can be prevented from occurring at the interface 62, and the diaphragm operation can be surely performed.

Further, if the first liquid 44 is formed by mixing the ethanol with the water, the freezing point (melting point) can be lowered, and the first liquid 44 can be prevented from freezing in a cold region. As a result, the optical element 40 can be used in a cold region.

In the optical element 40, the freezing point of the ethanol may be −114 degrees, the freezing point of ethylene glycol may be −13, and the freezing point of the first liquid 44 may be −40 or less.

According to the optical element 40 according to the present embodiment, different from the optical element according to the related art, the first liquid 44 and the second liquid 46 having substantially the same specific gravity are not selected, and the first liquid 44 is formed by mixing the three kinds of liquids, each of which has different specific gravity, with one another. Therefore, the specific gravity of the first liquid can be varied over a wide range, as shown by a region R in FIG. 9.

That is, in a case in which the two kinds of liquids with different specific gravity are mixed with each other, the specific gravity of the first liquid that is obtained by changing the mixing ratio between the two kinds of liquids can be changed within only a range of a straight line that connects the coordinates of the liquids, as shown in FIG. 9.

Meanwhile, in a case in which the three kinds of liquids are mixed with one another, as shown in FIG. 10, the specific gravity of the first liquid 44 can be varied in a large triangular region R that connects the three coordinates of pure water, ethanol, and ethylene glycol.

Accordingly, the specific gravity of the first liquid 44 and the specific gravity of the second liquid 46 can be made to be substantially the same. As a result, it is possible to simply manufacture an optical element 40 having desired characteristics.

Further, as shown in FIGS. 10 and 11, at least three kinds of liquids, each of which has different specific gravity and a different refractive index, for example, the pure water, the ethanol, and the ethylene glycol are mixed with one another, and thus the first liquid 44 is obtained. Therefore, the specific gravity of the first liquid 44 and the specific gravity of the second liquid 46 can be made to be substantially the same. At the same time, the refractive index of the first liquid 44 and the refractive index of the second liquid 46 can be made to be substantially the same. Therefore, it is possible to prevent a lens effect from occurring.

Further, in the optical element 40, the case has been described in which the pure water, the ethanol, and the ethylene glycol are used as a plurality of kinds of liquids to obtain the first liquid 44. However, the plurality of kinds of liquids used are not limited to the pure water, the ethanol, and the ethylene glycol, but various existing liquids may be selected.

Figure 12:
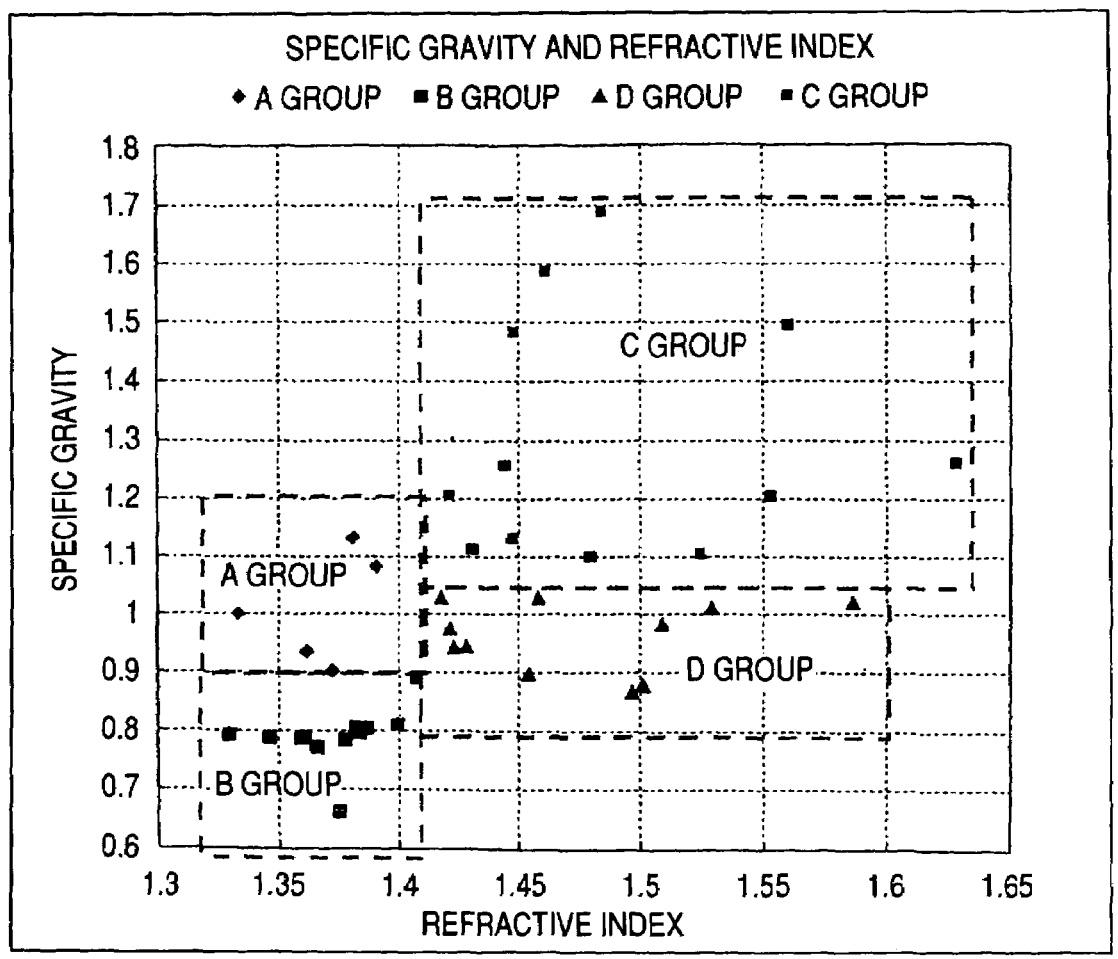
FIG. 12 is a diagram illustrating specific gravity and refractive indexes of various kinds of liquids.

FIG. 12 is a diagram illustrating specific gravity and refractive indexes of various kinds of liquids, and FIG. 13 is a diagram illustrating numerical values of specific gravity and refractive indexes of various used liquids.

For example, as shown in FIG. 12, as used liquids, an A group, a B group, a C group, and a D group are exemplified, and specific names of the liquids that are used in the A to D groups are shown in FIG. 13.

In the A group, the refractive index is not less than 1.32 and less than 1.41, and its specific gravity is not less than 0.9 and less than 1.2.

In the B group, the refractive index is not less than 1.32 and less than 1.41, and the specific gravity is not less than 0.6 and less than 0.9.

In the C group, the refractive index is not less than 1.41 and less than 1.63, and the specific gravity is not less than 1.05 and less than 1.7.

In the D group, the refractive index is not less than 1.41 and less than 1.6, and the specific gravity is not less than 0.8 and less than 1.05.

Accordingly, the mixing ratio is varied in the a large triangular region that connects the coordinates of three kinds of liquids selected from any three groups selected from A to D groups as the three kinds of liquids, and thus the specific gravity and the refractive index can be varied.

That is, various known liquids in the related art are selected, and a mixing ratio between the selected liquids is varied. As a result, the specific gravity and the refractive index can be simply varied.

The kinds of liquids that are used in the first liquid are not limited to the three kinds, and may be four kinds or more.

Figure 14:
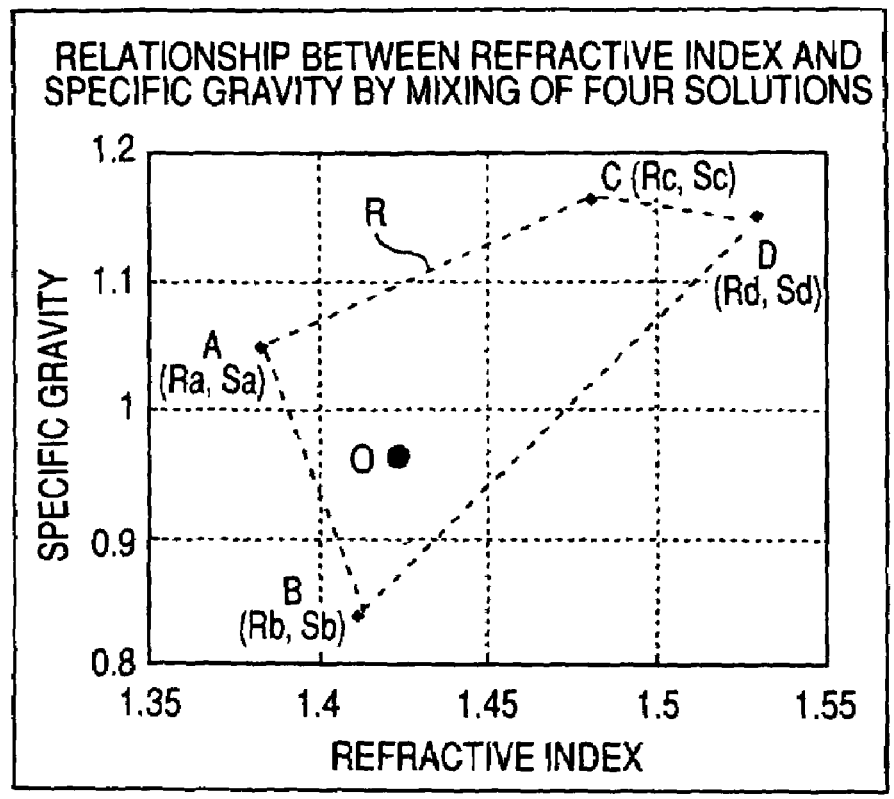
FIG. 14 is a diagram illustrating an adjustment range of a refractive index and specific gravity in a case in which four kinds of liquids A, B, C, and D are mixed.

As shown in FIG. 14, when the first liquid 44 is obtained by mixing four kinds of liquids A (whose refractive index is Ra, and whose specific gravity is Sa), B (whose refractive index is Rb, and whose specific gravity is Sb), C (whose refractive index is Rc, and whose specific gravity is Sc), and D (whose refractive index is Rd, and whose specific gravity is Sd), by varying a mixing ratio among the four kinds of liquids A, B, C, and D, the refractive index and the specific gravity of the first liquid 44 can be simply adjusted in a rectangular region R connecting the coordinates (Ra, Sa), the coordinates (Rb, Sb), the coordinates (Rc, Sc), and the coordinates (Rd, Sd), as shown by the coordinates O in FIG. 12.

Even in this case, the silicone oils (not shown) on the market that are scattered in the rectangular region R are used as the second liquid 46, and the four kinds of liquids are mixed to obtain the first liquid 44 whose specific gravity and refractive index are made to become substantially the same as the silicone oil.

Further, in the optical element 40, the case has been described in which single silicone oil is used as the second liquid 46. However, the plurality of kinds of silicone oils, each of which has a different refractive index or specific gravity, exist, one kind of silicone oil having desired characteristic may be selected to be used as the second liquid 46, or a plurality of kinds of silicone oils having different characteristic are selected, the mixing ratio between the plurality of kinds of silicone oils is varied to have a desired refractive index and desired specific gravity, and then used as the second liquid 46.

Further, in the optical element 40, the case has been described in which a direct current voltage is applied to the first liquid 44 to generate electrocapillarity. The voltage applied to the first liquid 44 is not limited to the direct current voltage, and an alternating current voltage or a pulse voltage, or a voltage that increases or decreases step by step may be used. That is, if electrocapillarity is generated in the first liquid 44, any voltage also may be used.

FIRST EMBODIMENT

Next, a first embodiment of the invention in which the optical element 40 premises will be described.

The inventors have discovered that in order to make the transmittance of the first liquid 44 smaller than the transmittance of the second liquid 46, the refractive index of the first liquid 44 is varied by varying the mixing ratio of the carbon black mixed in the first liquid 44.

In addition, in the first embodiment, the first liquid 44 and the second liquid 46 are formed such that they have the same specific gravity. The refractive index of the first liquid 44 is adjusted by the content of the carbon black mixed in the first liquid 44.

Figure 15:
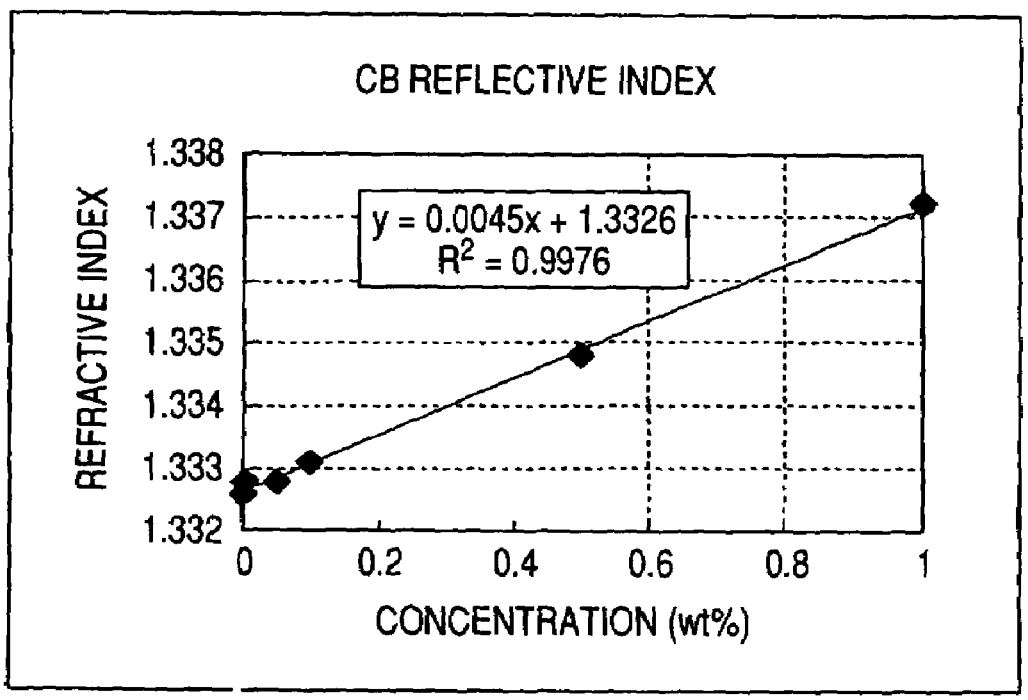
FIG. 15 is a diagram illustrating a refractive index with respect to the content of carbon black mixed in a first liquid 44.
Figures 16, 17:
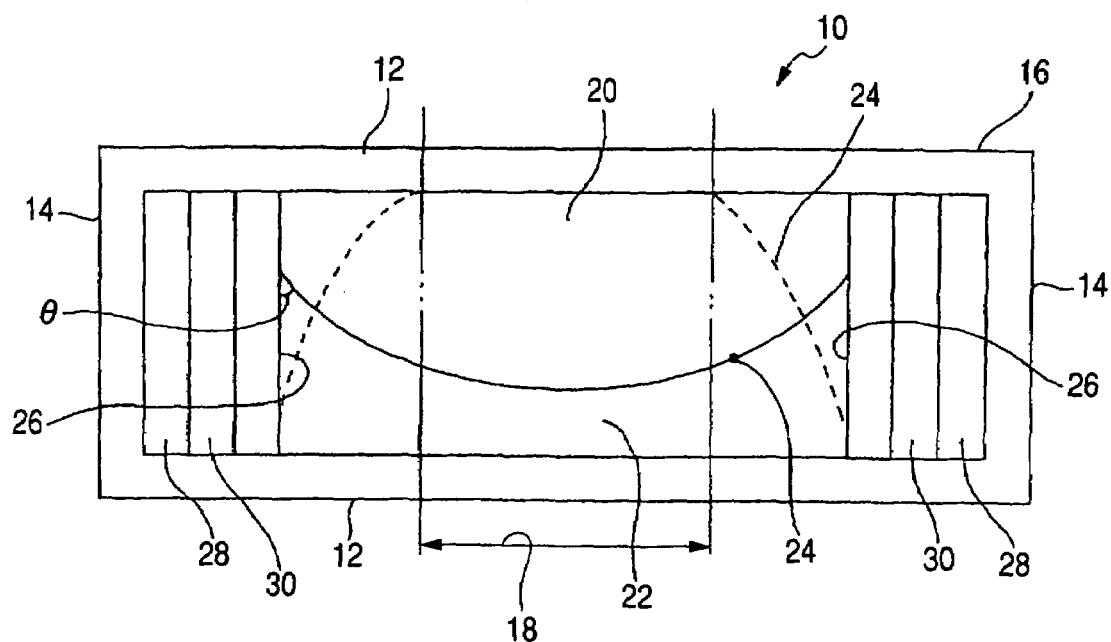
FIG. 16 is a diagram illustrating numerical values of respective coordinates of FIG. 15.
FIG. 17 is a diagram illustrating the structure of an optical element according to the related art.

FIG. 15 is a diagram illustrating a refractive index with respect to the content of carbon black mixed in a first liquid 44, and FIG. 16 is a diagram illustrating numerical values of respective coordinates of FIG. 15. In FIGS. 15 and 16, a unit that indicates the content of the carbon black is wt %.

As shown in FIGS. 15 and 16, it can be understood when the mixing ratio (content) of the carbon black mixed in the first liquid 44 increases, the refractive index increases in proportion to the mixing ratio.

When the refractive index of the first liquid 44 is not equal to the refractive index of the second liquid 46, the lens effect is generated at the interface 62 between the first liquid 44 and the second liquid 46. As a result, the diaphragm operation cannot be surely performed.

According to the present embodiment, by adjusting the content of the carbon black mixed in the first liquid 44, the refractive index of the first liquid 44 can be easily set to be substantially the same as the refractive index of the second liquid 46.

Accordingly, a lens effect can be prevented from occurring at the interface 62 between the first liquid 44 and the second liquid 46, and thus the diaphragm operation can be surely performed.

Further, the specific gravity of the first liquid 44 slightly increases by mixing the carbon black in the first liquid 44. Therefore, it is preferable that in regard to the specific gravity of the first liquid 44, the content of the carbon black be considered.

According the present embodiment, the case has been described in which the carbon black is used as the minute particles not transmitting the light mixed in the first liquid 44. However, materials that absorb or reflect light and do not transmit the light may be used as the minute particles.

The minute particles may be metal minute particles or minute particles of a metal compound. As the metal minute particle, for example, gold may be used. As the minute particles of the metal compound, for example, titan oxide may be used.

Further, when the minute particle has a property, such as the carbon black, which is difficult to be mixed in the first liquid 44, a hydrophilic process needs to be performed. However, when the minute particle has a property that may be easily mixed in the first liquid 44, the hydrophilic process does not need to be performed.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical element comprising:
an airtight container having opposing end face walls in a thickness direction, and side walls connecting the end face walls;
a first liquid sealed in the container and having polarity or conductivity;
a second liquid sealed in the container and not mixed with the first liquid so as to form an interface between the first liquid and the second liquid; and
voltage applying means for applying a voltage to the first liquid,
wherein the first liquid and the second liquid have the same specific gravity and substantially the same refractive index, and minute particles made of a material that does not transmit light are mixed in the first liquid, such that the first liquid has less light transmittance than the second liquid,
in a state in which the voltage is applied to the first liquid, the interface between the first liquid and the second liquid deforms, and a transmitting path of light is formed that passes through the end face walls and propagates in the thickness direction of the container,
the refractive index of the first liquid is set by adjusting the content of the minute particles in the first liquid, and
wherein at least three different kinds of liquids having different specific gravities are mixed in the first liquid to form a mixture, and the mixture has substantially the same specific gravity as the second liquid.

2. An optical element comprising:
an airtight container having opposing end face walls in a thickness direction, and side walls connecting the end face walls;
a first liquid sealed in the container and having polarity or conductivity;
a second liquid sealed in the container and not mixed with the first liquid so as to form an interface between the first liquid and the second liquid; and
voltage applying means for applying a voltage to the first liquid,
wherein the first liquid and the second liquid have the same specific gravity and substantially the same refractive index, and minute particles made of a material that does not transmit light are mixed in the first liquid, such that the first liquid has less light transmittance than the second liquid,
in a state in which the voltage is applied to the first liquid, the interface between the first liquid and the second liquid deforms, and a transmitting path of light is formed that passes through the end face walls and propagates in the thickness direction of the container,
the refractive index of the first liquid is set by adjusting the content of the minute particles in the first liquid, and
wherein the first liquid is composed of at least three kinds of liquids, and the at least three kinds of liquids include at least one of water, ethanol, or ethylene glycol.

3. The optical element according to claim 2, wherein the second liquid is silicone oil.

4. An optical element comprising:
an airtight container having opposing end face walls in a thickness direction, and side walls connecting the end face walls;
a first liquid sealed in the container and having polarity or conductivity;
a second liquid sealed in the container and not mixed with the first liquid so as to form an interface between the first liquid and the second liquid; and
voltage applying means for applying a voltage to the first liquid,
wherein the first liquid and the second liquid have the same specific gravity and substantially the same refractive index, and minute particles made of a material that does not transmit light are mixed in the first liquid, such that the first liquid has less light transmittance than the second liquid,
in a state in which the voltage is applied to the first liquid, the interface between the first liquid and the second liquid deforms, and a transmitting path of light is formed that passes through the end face walls and propagates in the thickness direction of the container,
the refractive index of the first liquid is set by adjusting the content of the minute particles in the first liquid, and
wherein the voltage applying means includes first electrodes provided on an entire circumference of inner surfaces of the side walls, respectively, and second electrodes provided at an outer circumference of an inner surface of one of the end face walls at which the first liquid is located.

5. An optical element, comprising:

an airtight container having opposing end face walls in a thickness direction, and side walls connecting the end face walls;

a first solution sealed in the container and having polarity or conductivity;

a second solution sealed in the container and not mixed with the first solution so as to form an interface between the first solution and the second solution; and a voltage applying section configured to apply a voltage to the first solution, wherein the first solution and the second solution have the same specific gravity and substantially the same refractive index, and minute particles made of a material that does not transmit light are mixed in the first solution, such that the first solution has less light transmittance than the second solution, in a state in which the voltage is applied to the first solution, the interface between the first solution and the second solution deforms, and a transmitting path of light is formed that passes through the end face walls and propagates in the thickness direction of the container, the refractive index of the first solution is set by adjusting the content of the minute particles in the first solution, and wherein a diameter of a region where only the second solution exists can be increased or decreased by adjusting the voltage.

* * * * *